Sept. 27, 1932.
G. V. JAMES
1,879,280
GUARD FOR CIRCULAR SAWS
Filed Aug. 30, 1930
2 Sheets-Sheet 1
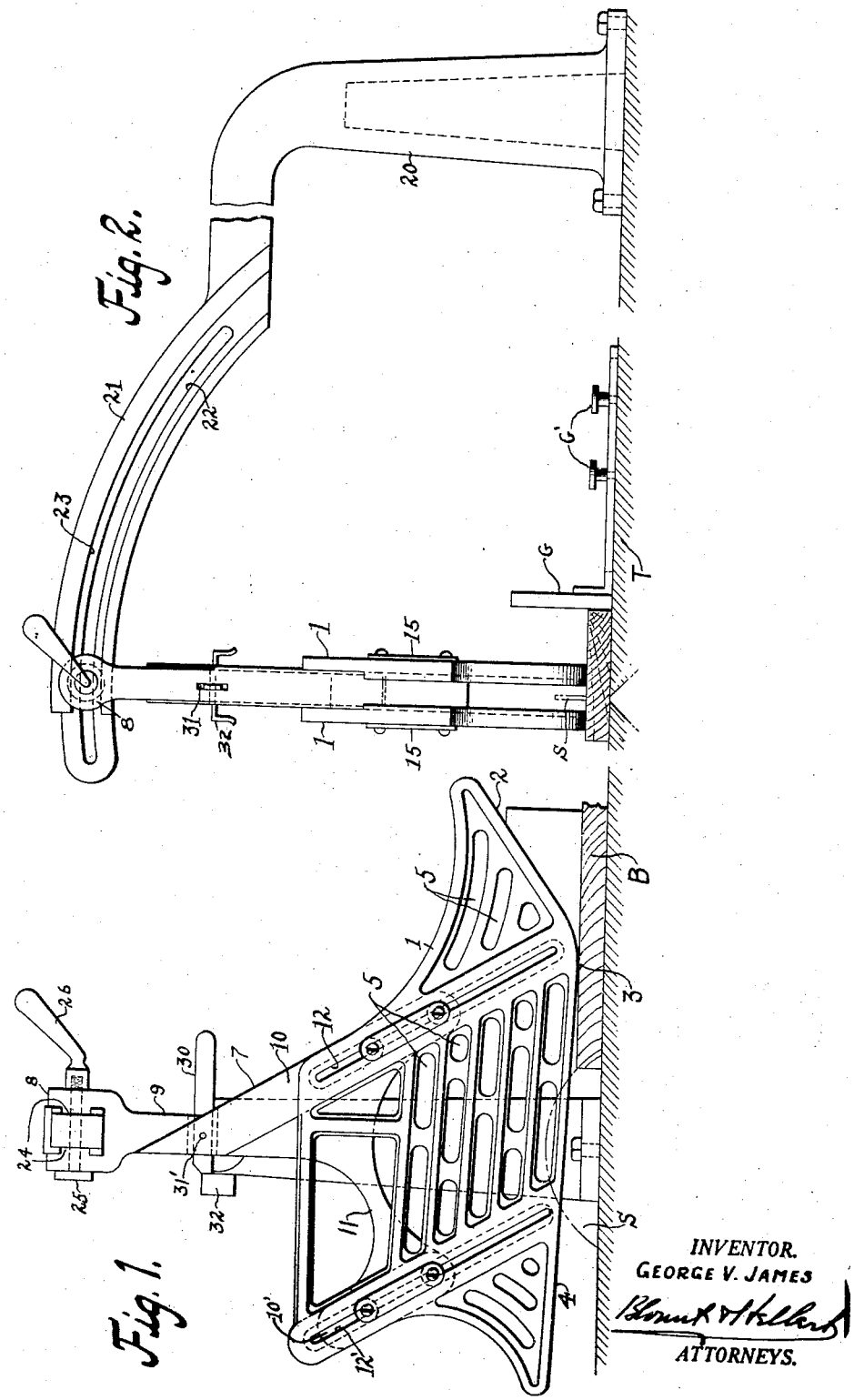
INVENTOR.
GEORGE V. JAMES
ATTORNEYS.

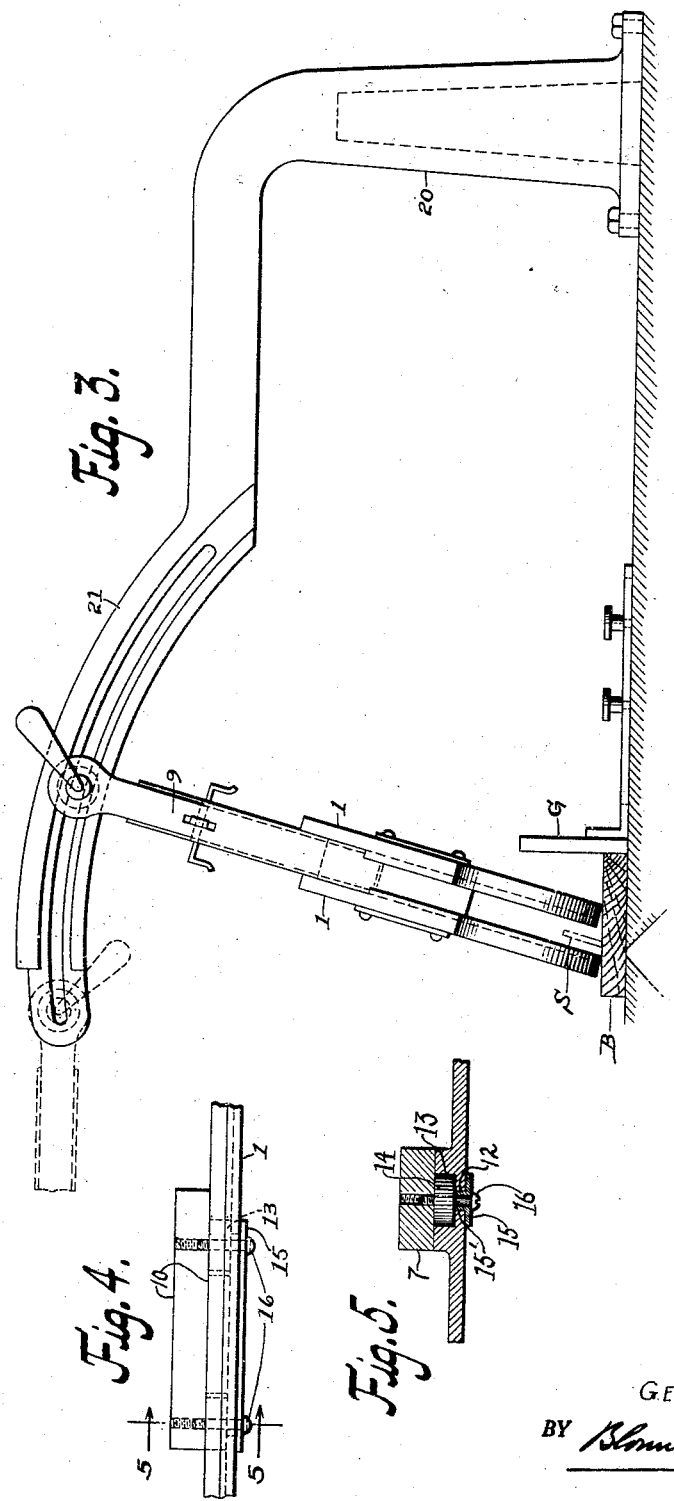

Patented Sept. 27, 1932

1,879,280

UNITED STATES PATENT OFFICE

GEORGE V. JAMES, OF YOUNGSTOWN, OHIO

GUARD FOR CIRCULAR SAWS

Application filed August 30, 1930. Serial No. 478,976.

Various sorts of guards for circular saws have heretofore been proposed but, so far as I am aware, all of them are unsatisfactory for the reason that, when it is desired to incline the plane of the saw to that of the work table through which it projects, it is impossible to correspondingly incline or adjust the guard so as to permit it to perform its intended function of guarding the saw; consequently the guard has to be either raised entirely clear of the saw or else removed, thus leaving the saw unguarded. This condition results from the fact that saw guards, as usually constructed, are capable of vertical movement only, so that while they may readily be raised and lowered and thus disposed so as to guard the saw when the plane of the latter is normal to the table on which the block or article being sawed is supported, they are not adapted to receive and guard the saw when its plane is relatively inclined thereto.

A principal object of the present invention, therefore, is to provide a guard particularly adapted for use in connection with circular saws which is effective to properly guard the saw whether the plane of the latter is normal to the surface of the table or inclined thereto and whether extending in a vertical plane or otherwise.

A further object of the invention is the provision of a saw guard of the character aforesaid which is substantially automatic in action; which does not in any position of adjustment interfere with the normal operation and use of the saw; which is adapted to properly guard the saw throughout the operation thereof on a given piece of work which may be readily momentarily withdrawn from its normal position of operative association with the saw so as to clear the blade of the latter to permit inspection or adjustment thereof or for other purposes; which is simple in design and construction and of relatively light weight and not liable to get out of order under ordinary conditions of use; which may be moved and temporarily maintained entirely clear of the saw to permit the sawing of excessively thick pieces;
and which is otherwise satisfactorily operative for the performance of its intended function.

Other objects, advantages and novel features of construction and arrangement comprehended by my invention are hereinafter more definitely pointed out or will be apparent to those skilled in the art from the following description of a preferred embodiment thereof as shown in the accompanying drawings.

In said drawings, Fig. 1 is a side elevation of the guard in operative association with a circular saw and saw table and showing the position assumed by the guard as a piece of work is being moved thereunder and against the saw; Fig. 2 is a front elevation of the guard as shown in Fig. 1; Fig. 3 is a view similar to Fig. 2 but showing guard as it appears when adjusted for operation when the saw is disposed with its plane oblique to the adjacent surface of the table, this view also showing in dotted lines the position to which the saw guard may be brought so as to entirely clear it from the saw as hereinafter described; Fig. 4 is a fragmentary enlarged detail view showing one of the guard plates and the arrangement of the anti-friction bearings on which it is supported while Fig. 5 is a section on line 5—5 thereof. The same symbols of reference are used to designate the same parts in several figures.

More specifically, the guard is shown in operative association with a circular saw S which in the ordinary way extends through a slot in the usual table T and which, together with the table may be of any desired construction.

The saw guard proper comprises a pair of similar but oppositely formed guard plates, 1—1, which are preferably made of aluminum or other light metal and respectively adapted to lie on opposite sides of the saw. As best shown in Fig. 1, each plate comprises a forwardly projecting toe 2 whose lower edge is downwardly and rearwardly inclined to the lowest point 3 of the plate which is curved to form a shoe and from which the lower edge of the plate is upwardly and rearwardly inclined, as at 4, the arrangement being such that when a block of wood or other material

B which is to be sawed is pushed rearwardly along the table T beneath the toes of the guard plates until it encounters the lowest points or shoes 3 thereof which normally rest on the table, further movement of the block is effective to lift the guard plates as hereinafter described until the shoes rest on the upper surface of the block as shown in the drawings, in which position they remain until the opposite end of the block passes beneath them toward the conclusion of the sawing operation. Thereafter the plates gradually descend to normal position as the end of the block moves along the upwardly inclined surfaces 4 until it is finally cleared from beneath the guard, preparatory to the sawing of the succeeding block or other work piece.

Desirably each guard plate is provided with a plurality of suitably disposed perforations 5 with a view to decreasing its weight and also permitting the operator to view the saw by looking through the plate.

The guard plates are movably supported upon opposite sides of a spacer generally designated at 7, which in turn, is supported at its upper extremity as hereinafter described. This spacer preferably comprises a jaw-shaped head 8 surmounting a generally vertically depending neck 9 below which is arranged a flat forwardly and downwardly inclined surface 10 on each side of the spacer, against which the adjacent inner faces of the guard plates respectively engage and upon which they are free to slide when the plate moves up and down. Paralleling these surfaces and spaced rearwardly therefrom, generally similar surfaces 10' are provided for respectively receiving the inner faces of the guard plates at that point, that portion of the spacer upon which said surfaces 10' are formed being connected with the main portion thereof by a web 11, which is desirably curved at its lower edge on a radius substantially corresponding to that of the saw so as to give the latter maximum clearance when it is projected relatively far through the table as when sawing thick pieces.

Suitable means are provided for holding the guard plates in operative relation with the spacer and for permitting them to move individually up and down along the surfaces 10, 10', said means in their preferred embodiment being of such character as to require the application of a minimum amount of force to raise and lower each plate. To this end, therefore, I may provide each guard plate with a pair of inclined parallel slots 12 which are desirably relatively narrow adjacent the outer face of the plate but adjacent the inner face thereof are chamfered out to form a recess 13 (Fig. 5) adapted to receive the outer race of a suitable annular ball, roller or other anti-friction bearing 14, two of these bearings arranged in spaced relation being preferably provided in each recess in each of the guard plates.

Associated with each pair of bearings is a guide plate 15 which lies against the outer surface of the guard plate, overlaps the edges of the adjacent slot and is provided with an inwardly projecting fin 15' which extends through the slot and abuts the spacer, thus constraining the guard plate to move in its proper path, the depth of the fin being slightly greater than the thickness of the guard plate so as to afford the requisite clearance to insure freedom of movement. Each of the bearings is supported on a screw 16 extending through the guide plate and into the adjacent portion of the spacer 7 and it therefore results that when the two guard plates with their adjacent bearings and guide plates are assembled on the spacer as shown in Fig. 1, each guard plate is free to move in a path parallel to the slots 12—12', which are desirably inclined to the horizontal at an angle of about 60°, upon the anti-friction bearings 14, the extent of such movement being limited in the downward direction by the table T and in the upward direction by the length of the slots 12 and recesses 13.

The spacer 7 and guard plates which are operatively connected thereto as hitherto described, are supported, through the medium of the head 8, on a bracket comprising a pedestal 20 secured at its lower end to the table T or other suitable support and having at its upper end a suitably curved arm 21 comprising a central slot 22. The side faces of the arm, the curvature of which desirably conforms to the arc of a circle whose center is located in the plane of the table at about the center of the saw slot, are respectively cut out on opposite sides of the slot 22 so as to frm tracks 23 for the reception of oppositely inwardly projecting lugs 24 on the generally jaw shaped head 8, so that while the head can be slid along the tracks, the spacer and parts supported therefrom will occupy a radial position with regard to the arm 21 so long as the lugs on the head are engaged in the tracks. For holding the head in any position of adjustment on the arm, a non-rotatable stud 25 is extendd therethrough and through the slot 22 and the locking handle 26 threaded onto the projecting end of the stud so that by rotating the handle the jaws of the head can be clamped against the arm.

To enable the spacer and parts supported thereby to be moved when desired to a non-radial position with respect to the arm, that part of the arm which comprises the slot 22 is extended somewhat over center so that when the head is moved into alinement therewith, the lugs 24 will no longer engage in the tracks, thus permitting the spacer to be swung up to a substantially horizontal or any other desired position so as to clear the saw, as indicated in dotted lines in Fig. 3, in which position of course, it may be retained by rotating the locking handle 26.

I also preferably provide means for temporarily holding either or both of the guard plates in raised position on the spacer, said means desirably comprising a lever 30 extended through a slot 31 in the neck 9 and pivoted therein on a pin 31'. At the rear end of this lever I secure a spring clip 32 having depending ears respectively alined with the subjacent guard plates and adapted to receive and yieldingly retain them in raised position when they are pushed up into the clip, while the forward end of the lever is projected beyond the slot so as to form a convenient handle by means of which the operator can raise the spring slip so as to disengage it from the guard plates and permit the latter to descend. It will, of course, be understood that the purpose of the mechanism just described is to enable either or both guard plates to be temporarily held in raised position and clear of the saw to permit observation or adjustment of the latter; under normal conditions of operation the guard plates are both maintained in lowered position and thus either resting on the surface of the table or on the surface of the work which is being sawed.

I have shown the table T as carrying the usual guide G by means of which the path of the work is determined and which can be retained in any desired position of adjustment by means of thumb screws G', but of course the guide forms no part of the present invention.

It will thus be apparent that with the parts constructed and assembled substantially as above described, and assuming the table is disposed at right angles to the plane of the saw as shown in Figs. 1 and 2, the saw S is normally disposed between the guard plates 1—1 with the shoes 3 of the latter resting on the surface of the table. Under these conditions, when the work B is moved along the table toward the saw so as to bring its leading end into engagement with the shoes of the guard plates, the latter are raised substantially unitarily thus allowing the work to pass into engagement with the saw. Thereafter during the progressive movement of the work, the guard plates merely ride upon its surface until the rear end of the work clears the shoes and passes into the engagement with the inclined surfaces 4, following which the guard plates gradually descend until the shoes 3 once more contact the table. Of course, the extent of movement of the guard plates is limited by the length of the slots 12 and thus it sometimes happens that the block which is to be sawed is so thick that the height to which the plates can be raised is insufficient to allow the block to pass thereunder. Under such conditions, therefore, the guard may be entirely cleared from the saw by moving the head 8 out of the tracks in the curved arm 21 and then swinging the guard up to or even past horizontal position, as shown in dotted lines in Fig. 3, and securing it therein until the sawing of the excessively thick block or blocks is completed, after which the guard is again swung down to normal operative position adjacent the saw.

When the saw is brought to oblique position with respect to the table for the purpose of sawing bevels or the like as shown in Fig. 3, the guard plates may be adjusted into parallelism with the saw by moving the head 8 along the tracks in the arm 21 as shown in said figure and securing it in proper position thereon, after which the operation of the guard is similar to that when it is vertically disposed, the guard plates being free to rise and fall independently or together as the work is passed beneath them, the provision of the anti-friction bearings permitting the guard plates to move very freely under all conditions while the angular disposition of the slots 12 also tends to minimize the effort required to raise the plates when the work is moved thereunder. Of course, at any time either or both guard plates may be slid up so as to engage the resilient clip 32 to temporarily hold them in suspended position while the saw is being examined or adjusted.

It will thus be apparent that my improved saw guard may be readily adjusted so as to properly guard the saw either when the latter is disposed at right angles to the adjacent table or occupies an oblique relation thereto; that it may be readily swung up entirely clear of the saw when desired to permit the sawing of excessively thick blocks or for other reasons, and that the various adjustments required to maintain its proper relation with the saw under all conditions may be readily made with a minimum of time and effort.

While I have herein described a preferred form of my invention with considerable particularity, I do not thereby desire or intend to specifically limit myself to any precise details of design, construction and arrangement of the several parts as the same are capable of material modification in numerous respects without departing from the spirit and scope of the invention as defined by the appended claims; furthermore, while I have herein more especially referred to the use of the invention in connection with a circular saw, it may be employed with equal facility and benefit for guarding other forms of cutting tools such as grinding wheels and the like.

Having thus described my invention, I claim and desire to protect by Letters Patent of the United States:

1. The combination with a circular saw or the like having a work-supporting table and a saw blade extending through the table and adapted for angular operative adjustment with respect thereto, of a guard for the saw comprising supporting means mounted on the table independently of the saw blade, a depending member carried by said means, a pair of vertically movable guard plates angularly adjustable to accord with the angular adjustment of the saw blade and disposed on opposite sides of said member, and means for retaining said plates in assembled position thereon, the plates being adapted to normally embrace the saw blade and being individually slidable on said member in predetermined paths with respect to the saw blade independently of the angularly adjusted position thereof with respect to the table.

2. The combination with a circular saw or the like comprising a horizontally extending table and a saw blade projecting therethrough and angularly adjustable with respect to the plane of the table, of a guard embodying a support mounted on the saw table, spaced independently vertically movable plates adapted to embrace the saw blade, and means interconnecting said plates and said support and adjustable on the latter to vary the angular relation of the guard plates to the saw table in correspondence with the angular relation of the saw blade thereto whereby said plates may be maintained in substantial parallelism with the blade whatever be its angularly adjusted relation to the table.

3. A guard for a circular saw or the like comprising a pedestal having an arcuate arm adapted to extend over the saw, a spacing member depending from said arm and adjustably secured thereto, a slotted guard plate disposed on each side of said member and adapted to normally lie adjacent the side of the saw, and means carried by the spacing member and engaging the slots in the plates for maintaining the plates in assembled relation thereon for independent sliding movement with respect thereto in predetermined parallel paths.

4. A guard for a circular saw or the like comprising a pedestal adapted to be carried by the saw table and having an arcuate arm provided with oppositely disposed guideways, a spacing member carried by the arm and comprising adjustable means cooperative with said guideways to normally maintain the member in radial relation to the arm, a pair of guard plates disposed on opposite sides of the member and adapted to normally lie on opposite sides of the saw, and means operative to maintain each plate in slidable relation with the member.

5. In a circular saw guard, arcuate supporting means, a depending spacing member, means adjustably securing said member to said supporting means and adapted to normally maintain it in radial relation thereto, and a pair of guard plates disposed on opposite sides of said member and arranged for independent sliding movement with respect thereto along predetermined parallel paths.

6. In a circular saw guard, an arcuate supporting member, a depending spacing member, means for adjustably securing said member to said supporting means normally operative to maintain the member in radial relation thereto, and a pair of guard plates respectively disposed on opposite sides of the spacing member and independently slidable along predetermined paths with respect thereto, said securing means being releasable to allow the spacing member to be moved into non-radial relation with respect to the supporting means.

7. In a circular saw guard, an arcuate supporting member adapted to be secured to the saw table and to overhang the saw, a spacing member normally depending therefrom, adjustable means operative to maintain the spacing member in radial relation with the arcuate supporting means or in non-radial relation with respect thereto, and a pair of guard plates respectively disposed on opposite sides of the spacing member and independently slidable with respect thereto.

8. The combination with a circular saw or the like having a work supporting table and a saw blade extending therethrough and angularly adjustable with respect thereto, of a saw guard comprising supporting means secured to the table independently of the saw blade, spacing means, means operative to adjustably secure the spacing means to the supporting means in such manner that the angular relation of said means to the saw table may be varied in correspondence with the angular adjustment of the blade with respect thereto, a pair of relatively movable guard plates respectively disposed on opposite sides of the spacing means and adapted to embrace the saw blade, each of said plates comprising a shoe adapted for engagement by the work when it is moved toward the blade, and means for maintaining each of said plates in slidable relation with the spacing means.

9. In a circular saw guard, supporting means adapted for attachment to the saw table and comprising an arcuate arm, spacing means, means for adjustably securing the spacing means to said arm whereby the angular relation of said means to the table may be varied, a pair of slotted guard plates disposed on opposite sides of the spacing means and adapted to normally embrace the saw, each of said plates comprising a shoe adapted for engagement by the work when moved along the table toward the saw, and means including anti-friction bearings extending in the slots in the plates and adapted to maintain the latter in slidable engagement with the spacing means.

10. The combination with a circular saw having a rotatable saw blade and a table relatively angularly adjustable with respect thereto and through which a portion of the blade extends, of a saw guard comprising vertically reciprocable spaced guard plates normally disposed on opposite sides of the saw blade, supporting means mounted on the table independently of the saw blade, and adjustable means connecting the plates and the supporting means adapted to maintain the plates in parallelism with the saw blade in correspondence with the relative angular adjustment between the table and the saw blade.

In witness whereof I have hereunto set my hand this 28th day of Aug. 1930.

GEORGE V. JAMES.